May 22, 1956  B. L. TAYLOR  2,746,343
MOTION PICTURE APPARATUS
Filed April 16, 1953  2 Sheets-Sheet 1

INVENTOR
Barney L. Taylor

BY
ATTORNEYS

May 22, 1956
B. L. TAYLOR
2,746,343
MOTION PICTURE APPARATUS
Filed April 16, 1953
2 Sheets-Sheet 2
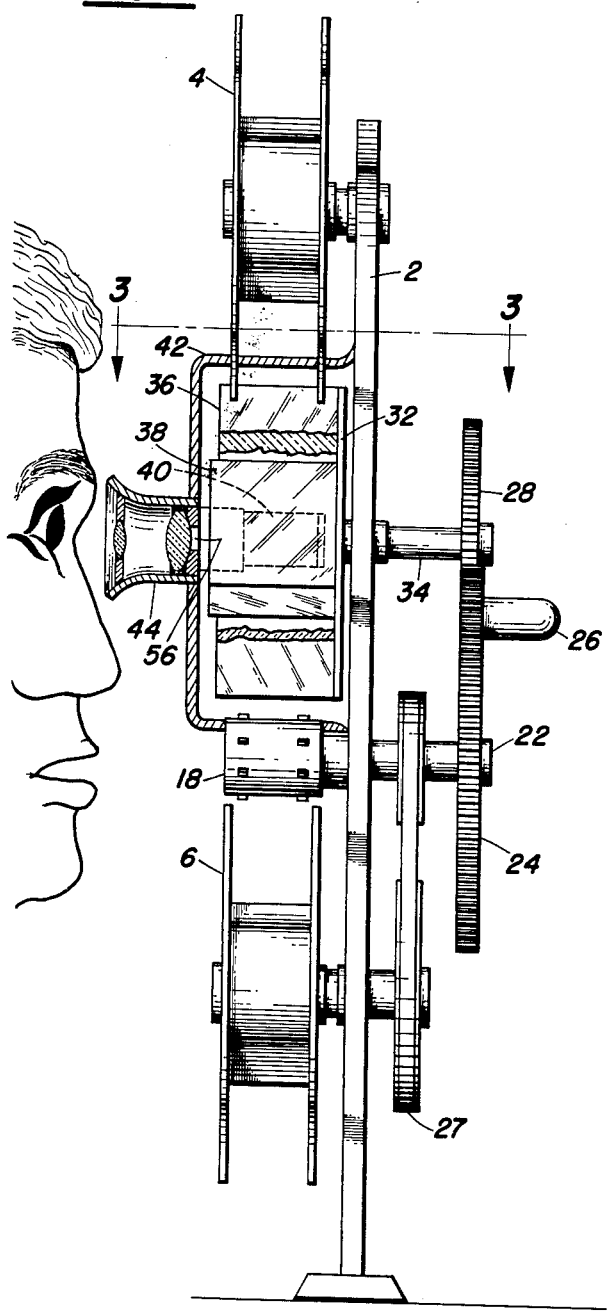
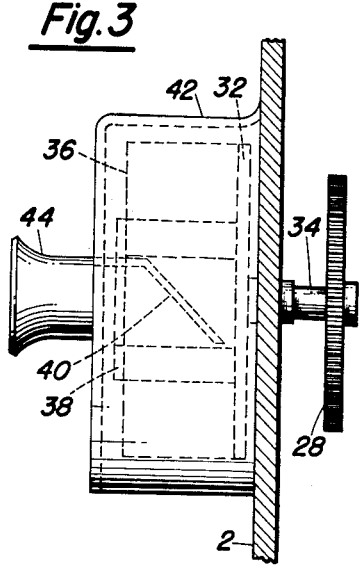
INVENTOR
Barney L. Taylor
BY
ATTORNEYS

United States Patent Office 2,746,343
Patented May 22, 1956

2,746,343
MOTION PICTURE APPARATUS

Barney L. Taylor, United States Navy

Application April 16, 1953, Serial No. 349,326

5 Claims. (Cl. 88—16.8)

(Granted under Title 35, U. S. Code (1952), sec. 266)

The invention described herein may be manufactured and used by or for the Government of the United States of America for governmental purposes without the payment of any royalties thereon or therefor.

This invention relates to motion picture apparatus and, more particularly, to motion picture apparatus wherein the motion picture film is advanced through the illuminated film gate of the apparatus at a uniform speed and an optical means is provided to maintain the beam of light emanating from each picture frame passing through the gate stationary at a determined position for observation of the picture.

Prior art apparatus of this general type exemplified by U. S. Patent No. 2,515,453 issued to F. L. Korb suffers from the defect of producing a picture which appears to the oserver to vibrate or jiggle up and down. A principal object of this invention, therefore, is to provide a motion picture apparatus of this general type improved so that the picture seen by the observer is free from any vibration or flicker.

The invention is similar in construction to the device of the Korb patent wherein the film is moved at a uniform rate of speed through an illuminated film gate while a refracting body adjacent the film gate is rotated in synchronism with the movement of the film and receives the beam of light emanating from the picture frames passing through the gate and refracts the light beam so that the beam of light issuing from the refracting body remains stationary for observation. The improvement over the Korb device consists in substituting for the Korb hollow square, which is subject to the aforementioned defect of producting a vibrating picture, a refracting body consisting of a pair of similar, regular, hollow polygons, one lying within the other and so oriented relative to each other that the corners of the inner polygon lie on apothems of the outer polygon. The light beam emanating from the picture frames passing through the illuminated gate is thus caused to pass through two refracting elements before passing on to the observer and this produces the illusion of motion pictures free from vibration. In applying this imrovement the only other important change in the Korb mechanism, which is otherwise essentially similar to the mechanism of the present invention, is that the driving system for the refracting body and that for the film must be so phased, and interrelated as to speed, that two adjacent picture frames are located at the center region of the gate aperture as the diagonal of one or the other hollow polygon becomes perpendicular to the film in the gate. That is, the common border between two adjacent frames lies exactly perpendicular to the diagonal of the polygon, while the diagonal is also perpendicular to the film in the gate.

Other objects and many of the attendant advantages of this invention will be readily appreciated as the same becomes better understood by reference to the following detailed description when considered in connection with the accompanying drawings wherein:

Fig. 2 represents an end view of the device taken from the right in Fig. 1, partially in section; and Fig. 3 is a view of a portion of the device of Fig. 1 taken along the line 3—3 in Fig. 2.

Figure 1:
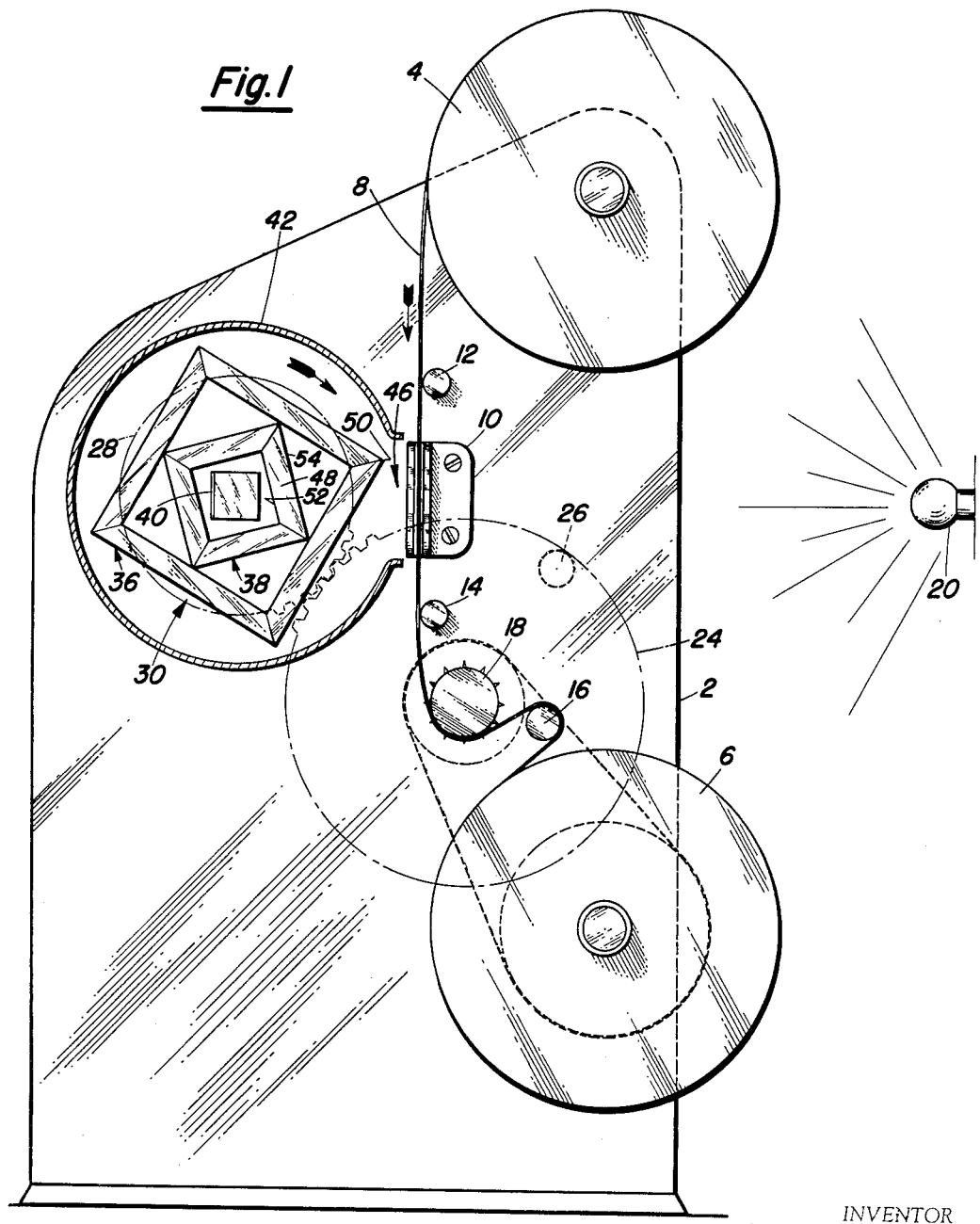
Fig. 1 represents a side view of a preferred embodiment of the invention, partially in section.

While the invention is applicable to motion picture apparatus in general, including projectors, the preferred embodiment chosen for illustration in the drawing is, for simplicity, a hand-driven viewer.

Reference is made to the drawings wherein numeral 2 indicates the frame of the device supporting a pair of film reels 4 and 6 for feeding film 8 through a more or less conventional gate 10 having an aperture approximately 2½ frames high. To maintain correct film tension the feed reel 4 is kept under tension by conventional means not shown. The film is guided by guide rollers 12, 14 and 16, as it is moved by the conventional sprocket wheel 18. The gate is illuminated by any conventional system of illumination, usually with a brilliant light source and lens system to produce parallel light, but adequately represented more or less schematically for use with a viewer by a light bulb 20.

The sprocket 18 is driven by a shaft 22 turned by a gear wheel 24 having a handle 26. Through a coil spring belt drive or the like 27, the shaft 22 also drives the takeup reel 6. A gear 28 driven from gear 24 rotates, in synchronism with the film, refracting means consisting of a refracting body 30 mounted on disc 32 carried on shaft 34. The refracting body consists of a first hollow regular polygon, illustrated in the preferred embodiment as a square 36, and a second hollow regular polygon, similar to the first polygon, shown as square 38. The square 38 lies within the square 36, both being concentric with the axis of rotation of the shaft 34 and the square 38 being so oriented relative to square 36 that the corners of square 38 lie on apothems extending from the common center of the polygons to the mid-points of the sides of the square 36. For receiving the light rays transmitted from the picture frames passing through the gate 10 after they have traversed the sides of the squares, a reflecting means is provided, shown as a mirror 40 lying within the interior square and supported by a shield portion 42 of the frame at 45° to the direction of the beam emanating from the picture frames. The shield portion 42 is provided with an eyepiece 44 extending from the side thereof and provided with objective and eyepiece lenses to enable observation of an image of the moving picture formed by light emanating from the picture frames and continuing thereafter through opening 46 in the shield to be refracted by body 30 and reflected by mirror 40 into the eyepiece.

The ratio of the gears 24 and 28, taken together with a number of teeth on the sprocket 18, is such that the number of picture frames passing through the gate per unit time is equal to the number of polygon corner-plus-side combinations passing adjacently by the gate in the same unit of time. In other words, while the refractor turns through an angle to replace one corner-plus-side combination, by the next, the film moves a distance equal to the height of one frame. That is, in the illustrated embodiment, for example, if the handle 26 is turned so as to feed the film 8 at the rate of say 16 frames per second through the gate, then the gear ratio must be such as to produce 2 revolutions per second of the refracting body, each revolution presenting adjacent the film 8 refracting combinations consisting of a side of one polygon passing parallel to the film plus a corner of the other polygon passing by simultaneously. In Fig. 1 the refracting combination passing the gate consists of side 48 of inner square 38 and corner 50 of outer square 36.

The angular phase relation of the sprocket 18 and the refracting body 30 is established so that two complete adjacent picture frames will lie in the central region of the aperture of the gate when a diagonal of one of the polygons is perpendicular to the film in the gate. This means, incidentally, that the prolongation of the diagonal will intersect at right angles the common border of the two adjacent picture frames when the diagonal is perpendicular to the film and when that border lies preferably at the center of the height of the gate aperture.

The squares 36 and 38 are made of good optical glass but can be made of optical resins or the like with good transmission properties. As shown in the drawing, the squares are formed, respectively, of four identical elements joined at mitered joints at the corners but each square could be made of a single piece or any number of pieces formed in such a way as to give the same optical properties as the illustrated embodiment. Preferably both squares are made of the same material and have sides of the same thickness. The thickness of each must be such that the refractive effect of the combination is sufficient to maintain stationary for the observer, the projection of each picture frame for the time that it is visible during operation. As shown, each side of each hollow square has plano-parallel faces, e. g. faces 52 and 54 of side 48, which are parallel to the axis of rotation of shaft 34. While the squares are shown as contiguous, they need not necessarily be so. The height and width of all faces of the polygons must be at least as great as the height and width of one picture frame, respectively.

If, because of inaccuracy of manufacture or unavailability of proper size stock from which to fabricate the refractor, the combined thicknesses of the sides of the hollow polygons are not exactly correct for producing the ideal transition from one picture frame to the next, this deficiency can be compensated for by interposing a lens (not shown) between the film in the gate and the refractor, the lens being adjustable in position, preferably. A magnifying lens is used if the sides of the polygons are too thick and a reducing lens if the sides are too thin.

Means are provided to delimit the beam after it leaves the inner face of the interior square to the height of one picture frame. In the illustrated embodiment, but assuming illumination by parallel light, this means is constituted by the rectangular aperture 56, being of such a height.

Operation

In operation the film 8 is threaded through the gate 10 from the storage reel 4 onto the takeup reel 6, the phase relations of the sprocket 18 with its gear 24 and the gear 28 which drives the refractor 30 being, as previously noted, such that two adjacent picture frames occupy the central region of the gate aperture when the refractor 30 is oriented with a diagonal, say a diagonal of square 36, perpendicular to the film in the gate. At this configuration the observer looking into eyepiece 44 sees a picture having the dimensions of one picture frame and composed of the top half of the upper frame, say frame B, in the gate and bottom half of the lower frame, say frame A, in the gate. As the handle 26 is turned, the picture seen by the observer remains stationary but its composition is changed as the bottom half of the upper frame B replaces the bottom half of the lower frame A until the observer is seeing only the entirety of the upper frame B, which by this time has descended in the gate so that its lower border no longer lies at the center of the gate aperture. For some period of time during further movement of the film the observer sees only frame B in its entirety, but thereafter the top of the next succeeding frame, C, begins to replace the top of frame B and the observer begins to see a composite picture whose top portion is the top portion of frame C and whose bottom portion is the bottom of frame B. When handle 26 has been rotated sufficiently to bring perpendicular to the film in the gate that diagonal of square 38 next adjacent, in a counterclockwise sense as viewed in Fig. 1, the aforementioned diagonal of square 36, then the film will have advanced to the point where frames B and C are occupying the central region of the gate aperture. At this point the observer is seeing a composite picture made of the top half of frame C and the bottom half of frame B. The transition from the observation of one entire frame through the observation of the composite picture to the observation of the next entire frame is accomplished smoothly with no dark spaces, with no noticeable change from one picture to the next as the film is moved through the machine, and with no detectable jiggling or up-and-down vibration of the picture. This result is achieved by refraction through the refractor 30 maintaining stationary the picture seen by the observer, even though the film is moving continuously, and even through the picture at times is a composite taken from two successive frames. The aperture in the gate must be sufficiently large (approximately 2½ times the height of a picture frame) to enable light from the bottom of any given frame to reach the refractor until the next succeeding frame has in its entirety displaced the given frame.

It is apparent to one skilled in the art that the invention can be widely modified without essential departure from the spirit thereof to attain the purposes of the invention. For example, as previously indicated, the hollow, regular polygons need not be squares, but can have any number of sides; the means delimiting the film area seen by the observer can be constituted by the size of the mirror 40 or can be an orifice, similar to Korb's, placed close to the mirror 40; the mirror 40 can be replaced with a prism, as in Korb. The invention can be used for stereoscopic motion pictures by running simultaneously with the film 8 of Fig. 1 a second film in a direction opposite to that of the film 8 through a gate located diametrically opposite the gate 10 relative to the axis of rotation of the refractor 30. In this case the inner polygon of the refractor 30 has to be sufficiently large to accommodate two reflecting elements such as mirror 40, each oriented to view one of the two stereoscopic films, and additional optics are provided to bring the beams of light from both films into proper position for viewing by the observer as a three-dimensional picture.

Obviously many other modifications and variations of the present invention are possible in the light of the above teachings. It is therefore to be understood that within the scope of the appended claims the invention may be practiced otherwise than as specifically described.

What is claimed is:

1. For use in a motion picture device comprising in combination, a film gate having an aperture therein in excess of two frames high; means for projecting a beam of light through said aperture to substantially uniformly illuminate said aperture; means for feeding a motion picture frame through said gate at a substantially uniform rate sufficient to produce the illusion of continuous motion; and means for refracting the beam of light emanating from each picture frame as a stationary beam at a determined focal point along the path of the projected beam; the improvement which comprises said refracting means, a rotatable refracting body consisting of a first hollow regular polygon and a second hollow regular polygon similar to said first polygon and lying within said first polygon, said polygons being so relatively oriented that each corner of the interior polygon lies on the apothem extending from the common center of the polygons through the midpoint of a side of the exterior polygon; the body being mounted for rotation about an axis passing through the common center of the hollow polygons and lying in and perpendicular to the path of the projected beam; the sides of said hollow polygons having plano-parallel faces which are parallel to said axis of rotation, said faces having a width and height at least as great as the width and height of one picture frame, said sides having thicknesses combining to provide refraction of a moving beam of light emanating from a picture frame maintaining said beam at a level fixed relative to said axis after it leaves the inner face of a side of the interior polygon; means interposed in the path of said beam after it leaves the inner face of said interior polygon to delimit the beam to the height of one frame, and means for rotating said refracting body so that the sides of the body adjacent the moving film move in the same direction as the film is moving and so synchronized and at a rate relative to the rate of film movement that two complete picture frames occupy the central region of the gate aperture when the diagonal of each polygon is perpendicular to the film and to the common border of the two frames, the number of picture frames passing through the gate per revolution of the refracting body being equal to the number of diagonals becoming successively perpendicular to the film per revolution of the refracting body.

2. The device of claim 1 wherein said polygons are squares.

3. The device of claim 1 wherein said polygons are contiguous.

4. A refracting device for use with uniform film feed motion picture apparatus comprising a refracting body consisting of a first regular, hollow polygon, a second regular, hollow polygon lying within the first hollow polygon, similar thereto, concentric therewith, and so oriented relative thereto that the corners of said second polygon lie on the apothems of said first polygon; and means for mounting said body for rotation about an axis perpendicular to the plane of the polygons and passing through their common center; the sides of said polygons having plano-parallel opposite faces which are parallel to said axis.

5. The device of claim 4 wherein said polygons are squares.

References Cited in the file of this patent

UNITED STATES PATENTS

| | | |
|---|---|---|
| 2,352,214 | Ligh | June 27, 1944 |
| 2,515,453 | Korb | July 18, 1950 |

FOREIGN PATENTS

| | | |
|---|---|---|
| 265,291 | Great Britain | Feb. 4, 1927 |